(12) United States Patent
Han et al.

(10) Patent No.: US 8,252,438 B2
(45) Date of Patent: Aug. 28, 2012

(54) LITHIUM ION BATTERY

(75) Inventors: Lei Han, Shenzhen (CN); Tianzeng Bao, Shenzhen (CN)

(73) Assignee: Byd Co., Ltd., Shenzhen (CN)

( * ) Notice: Subject to any disclaimer, the term of this patent is extended or adjusted under 35 U.S.C. 154(b) by 0 days.

(21) Appl. No.: 13/335,005

(22) Filed: Dec. 22, 2011

(65) Prior Publication Data

US 2012/0135286 A1  May 31, 2012

Related U.S. Application Data

(63) Continuation of application No. PCT/CN2010/072952, filed on May 19, 2010.

(30) Foreign Application Priority Data

Jun. 26, 2009  (CN) .......................... 2009 2 0133723

(51) Int. Cl.
*H01M 4/00* (2006.01)
*H01M 2/16* (2006.01)
(52) U.S. Cl. ..................... 429/66; 429/246; 429/247
(58) Field of Classification Search ............. 429/66, 429/94, 163, 246, 247
See application file for complete search history.

(56) References Cited

U.S. PATENT DOCUMENTS

| 5,935,731 A | 8/1999 | Nagaura |
| 6,395,428 B1 * | 5/2002 | Kezuka ................. 429/300 |
| 6,899,978 B2 | 5/2005 | Fitter |

FOREIGN PATENT DOCUMENTS

| CN | 2605670 Y | 3/2004 |
| CN | 1537341 A | 10/2004 |
| CN | 1941490 A | 4/2007 |
| CN | 2919553 Y | 7/2007 |
| CN | 101399328 A | 4/2009 |
| JP | 2165570 A | 6/1990 |
| JP | 2006286597 A | 10/2006 |
| JP | 2008251196 A | 10/2008 |

OTHER PUBLICATIONS

PCT International Search Report and Written Opinion mailed Aug. 26, 2010, for International Application No. PCT/CN2010/072952.
PCT International Preliminary Report on Patentability issued Jan. 4, 2012, for International Application No. PCT/CN2010/072952.
Search Report dated Mar. 17, 2010, for related Chinese Application No. 200920133723.3.

* cited by examiner

*Primary Examiner* — Roy King
*Assistant Examiner* — Carlos Barcena
(74) *Attorney, Agent, or Firm* — Finnegan, Henderson, Farabow, Garrett & Dunner, LLP

(57) ABSTRACT

A lithium ion battery is provided comprising a shell, an electric core disposed in the shell with a space formed therebetween, and a non-aqueous electrolyte housed in the shell, in which the space is filled with a non-aqueous electrolyte resistant filler.

10 Claims, 1 Drawing Sheet

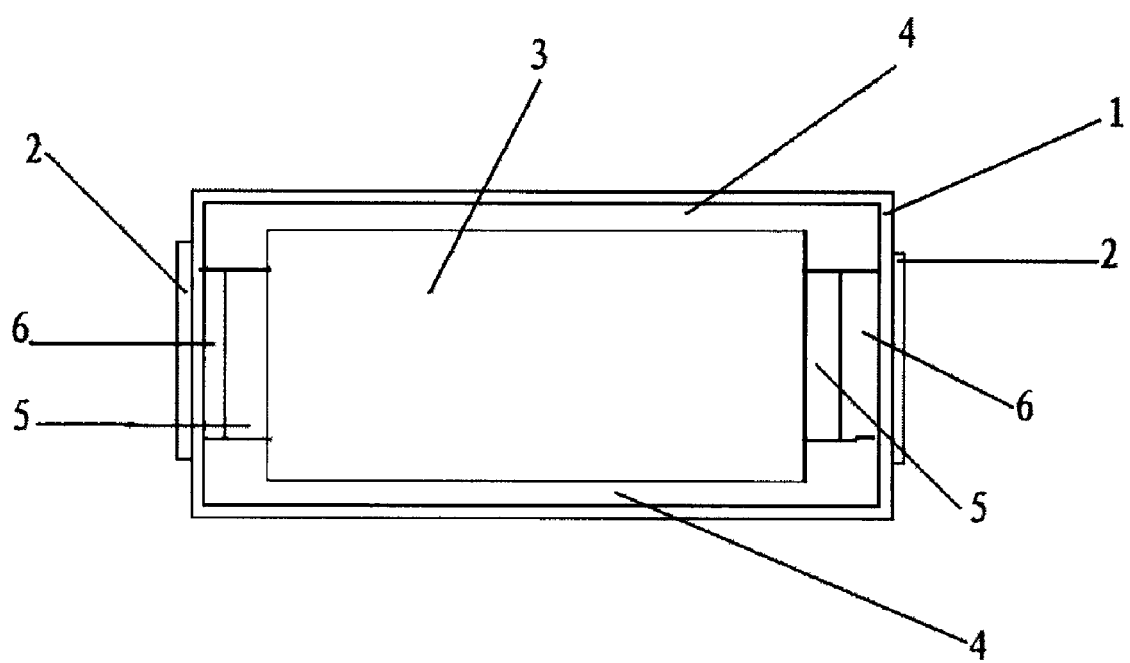

LITHIUM ION BATTERY

CROSS-REFERENCE TO RELATED APPLICATION

This application is a continuation of International Application No. PCT/CN2010/072952, filed May 19, 2010, designating the United States of America, which claims priority to and benefits of Chinese Patent Application No. 200920133723.3, filed with the State Intellectual Property Office of the P. R. China on Jun. 26, 2009, the entire contents of both of which are incorporated herein by reference.

TECHNICAL FIELD

The present disclosure relates to a lithium ion battery.

BACKGROUND

Technology for lithium ion batteries has been developed rapidly in the last twenty years. As a type of new energy resources, lithium ion batteries may have many advantages such as high voltage, high capacity, low consumption, no memory effect, no pollution, small volume, high specific energy, low internal resistance, low self-discharge rate, multiple cycle times, good safety performance, and various choices of volumes and appearance. Therefore, lithium ion batteries have emerged as one of the most important kinds of batteries. Now lithium ion batteries are getting more and more attentions and have been widely used in various kinds of electronic products such as laptops and mobile telephones.

With increasing demands for lithium ion batteries, requirements for their preparation technology have become higher to obtain higher energy density and better electrochemical performance. The trend of battery technology development is to improve capacity, cycle performance, safety performance and high-temperature storage performance of lithium ion batteries.

It is known in the art that the internal volume of a battery may comprise: the volume of the electric core and other structural parts, the volume of the electrolyte and the preserved gas swelling volume. Currently, due to the limitation of injection molding technology for manufacturing the structural parts and the compressibility of the volume of the electric core, residual space may be formed in the battery shell. The presence of the residual space may increase the amount of the electrolyte to be filled. When the battery swells in use, the distance between electrode plates may increase, resulting in elongated ion exchange path, reduced battery cycle performance, and increased manufacturing cost and battery weight. Moreover, the residual space may allow wrinkling of the ion exchange film in the electric core, and the wrinkles thus formed may cause the generation of lithium dendrites and potential safety issues. Furthermore, due to the presence of the residual space, after the electrolyte is filled, the separator immersed in the electrolyte may swell so that the surfaces of the electrode plates and the separator may not be in close proximity, thus affecting the battery capacity.

SUMMARY

The present disclosure is directed to provide a lithium ion battery having simple structure, and good safety and cycle performance.

A lithium ion battery is provided herein, comprising a shell, an electric core disposed in the shell with a space formed therebetween, and a non-aqueous electrolyte housed in the shell, wherein the space is filled with a non-aqueous electrolyte resistant filler.

According to an embodiment of the present disclosure, the filler may comprise spherical particles having an average diameter ranging from about 1 mm to about 15 mm. According to yet another embodiment of the present disclosure, the filler may comprise hollow spherical particles having an average inner diameter ranging from about 1 mm to about 10 mm, and an average outer diameter ranging from about 2 mm to about 15 mm.

Embodiments of the present disclosure may have the advantages of reduced space between the shell and the electric core, and thus improved battery safety performance and enhanced cycle performance.

BRIEF DESCRIPTION OF THE DRAWINGS

FIG. 1 is a schematic view showing a residual space inside a battery: 1: a battery shell; 2: positive and negative terminals; 3: a battery electric core; 4: a residual space inside the battery; 5: battery lugs; and 6: electrical connectors.

DETAILED DESCRIPTION OF THE EMBODIMENTS

According to some embodiments of the present disclosure, a lithium ion battery may comprise a shell, an electric core disposed in the shell with a space formed between the electric core and the shell, and a non-aqueous electrolyte housed in the shell. FIG. 1 is a schematic view showing a residual space inside a battery according to one embodiment. As shown in FIG. 1, the battery includes a battery shell 1, positive and negative terminals 2, a battery electric core 3, a residual space 4 inside the battery, battery lugs 5, and electrical connectors 6.

The space between the shell and the electric core may be filled with a filler. The battery may further comprise a positive electrode plate, a negative electrode plate, and a separator disposed therebetween.

There is no particular limitation on the amount of the filler which may be adjusted according to the size of the battery.

According to some embodiments of the present disclosure, the filler may comprise at least one selected from polyphenylene sulfide, polyphenylether, polyethylene, polypropylene, polytetrafluoroethylene, polyperchlorethylene, high density polyethylene, and polyvinylidene chloride. There is no special restriction on the proportion of the composition of the filler when the filler is a mixture of the compounds described above.

According to some embodiments of the present disclosure, the filler may have a particle, strip, stick or board shape. In some embodiments, the filler may comprise spherical particles having an average diameter ranging from about 1 mm to about 15 mm. According to some embodiments, the filler may comprise hollow spherical particles having an average inner diameter ranging from about 1 mm to about 10 mm, and an average outer diameter ranging from about 2 mm to about 15 mm. Compared with the prior art where the residual space is only filled with the electrolyte, filling the battery with hollow spherical particles may decrease the amount of the electrolyte to be filled and thus reduce the cost of the battery. Meanwhile, the presence of the filler may reduce the deformation of the electric core during charging and discharging, and shorten the distance between electrodes, therefore enhancing the charging efficiency and the battery capacity. Moreover, the filler according to some embodiments of the present disclosure may be elastic, so that when the battery swells during charging and discharging, the internal pressure may be released via the filler. Therefore, wrinkling of the separator may be avoided and the safety performance may be enhanced.

The separator used during winding may be any kind of lithium battery separators well known in the art. The separator may be interposed between the positive electrode plate and the negative electrode plate. The separator is electrically insulated and also has good electrolyte retaining performance. According to some embodiments of the present disclosure, the separator may be any kind of separators used in secondary lithium ion batteries known in the art, such as polyolefin micro-porous membrane, polyethylene felt, glass fiber felt or ultrafine glass fiber paper.

The battery shell may be any kind of those used for preparing batteries well known in the art. According to some embodiments, the battery shell may be made of aluminum or steel.

The positive electrode plate may be any kind of those well known in the art. In some embodiments, the positive electrode plate may comprise a positive current collecting substrate and a positive electrode active material coated and/or filled thereon. The positive current collecting substrate may be any one well known in the art such as aluminum foil or copper foil. The positive electrode active material may comprise a positive electrode active substance and an adhesive, in which the positive electrode active substance may be any one known in the art for the lithium ion battery. According to some embodiments of the present disclosure, the positive electrode active substance may comprise $LiCoO_2$, $LiFePO_4$ or $LiMnO_2$. The adhesive may be any one well known in the art such as polyvinylidene fluoride (PVDF). In some embodiments, the amount of the adhesive may range from about 0.01% to about 8% by weight of the positive electrode active substance. According to some embodiments, the amount of the adhesive ranges from about 1% to about 5% by weight of the positive electrode active substance. The positive electrode active material may also comprise a positive electrode additive. The positive electrode additive may be any one well known in the art and may be selected from conductive agents, for example, at least one of acetylene black, conductive carbon black and conductive graphite. The content of the additive may range between about 0% to about 15% by weight of the positive electrode active substance. According to some embodiments of the present disclosure, the content of the additive may range from about 0% to about 10% by weight of the positive electrode active substance.

The negative electrode plate may be any kind of those well known in the art and may comprise a negative current collecting substrate and a negative electrode active material coated and/or filled thereon. The negative current collecting substrate may be any one well known in the art such as copper foil. The negative electrode active material may comprise a negative electrode active substance and an adhesive. The negative electrode active substance may be any one commonly used in lithium ion batteries, such as natural graphite and artificial graphite. The adhesive may be any one well known in the art such as polyvinylidene fluoride (PVDF) and polyvinyl alcohol. The adhesive may range from about 0.01% to about 10% by weight of the negative electrode active substance. According to some embodiments, the adhesive may range from about 1% to about 9% by weight of the negative electrode active substance.

The preparation method of the positive electrode plate may comprise: coating a positive slurry containing the positive electrode active substance, the adhesive and a solvent onto the positive current collecting substrate having a large width; drying the substrate coated with the positive slurry, rolling the dried substrate and then cutting the substrate into positive electrode plates. The solvent dissolving the positive electrode active substance and the adhesive may be any conventional solvent known in the art. According to some embodiments of the present disclosure, the solvent may be selected from N-methyl-2-pyrrolidone (NMP) and dimethyl formamide (DMF). The dosage of the solvent may satisfy that the positive slurry should be enough to be coated onto the current collector. Generally, the amount of the solvent may range from about 40% to about 90% by weight of the positive electrode active substance. In some embodiments, the amount of the solvent may range from about 50% to about 85% by weight of the positive electrode active substance. The drying temperature may range from about 50° C. to about 160° C. In some embodiments, the drying temperature may range from about 80° C. to about 150° C. The rolling step may be used to adjust the thickness of the positive electrode plate, and the thickness may vary in a broad range depending on the requirements of different batteries. The width of the positive electrode plate may be adjusted by cutting, and may vary in a broad range depending on the requirements of different batteries.

The preparation method of the negative electrode plate may be substantially the same as that of the positive electrode plate, except for a negative slurry containing the negative electrode active substance.

The non-aqueous electrolyte may comprise a lithium salt electrolyte and a non-aqueous solvent. The lithium salt electrolyte may be at least one selected from lithium hexafluorophosphate ($LiPF_6$), lithium perchlorate ($LiClO_4$), lithium tetrafluoroborate ($LiBF_4$), lithium hexafluoroarsenate ($LiAsF_6$), lithium halide, lithium aluminum tetrachloride and lithium fluoro-alkyl sulfonate. The non-aqueous solvent may comprise an organic solvent, such as a mixture of chain-like acid esters or cyclic acid esters. The chain-like acid ester may comprise at least one selected from dimethyl carbonate (DMC), diethyl carbonate (DEC), ethyl methyl carbonate (EMC), methyl propyl carbonate (MPC), dipropyl carbonate (DPC) and other fluorine-containing, sulfur-containing or unsaturated bond-containing chain-like organic esters. The cyclic acid ester may comprise at least one selected from ethylene carbonate (EC), propylene carbonate (PC), vinylene carbonate (VC), γ-butyrolactone (γ-BL), sultone and other fluorine-containing, sulfur-containing or unsaturated bond-containing cyclic organic esters. In the non-aqueous electrolyte, the concentration of the lithium salt electrolyte may range from about 0.1 mol/L to about 2 mol/L. According to some embodiments, the concentration of the lithium salt electrolyte may range from about 0.8 mol/L to about 1.2 mol/L.

The winding method of the positive electrode plate, negative electrode plate and the separator, and the assembling method of the battery are those well known in the art.

An embodiment of the lithium ion battery comprising a laminated electric core will be described below.

The lithium ion battery disclosed herein may comprise the shell, a battery pole and the electric core. The shell may be quadrangular or cylindrical and generally made of a metal material. The battery pole may comprise a positive pole and a negative pole. The electric core may be formed by superposing or winding the positive electrode plate, the separator and the negative electrode plate in turn in the thickness direction of the battery. A positive tab and a negative tab may be provided at an upper end and/or a lower end of each of the positive and negative electrode plates, respectively. According to some embodiments, the positive and negative tabs of the adjacent positive and negative electrode plates are located at the upper and lower ends of the electric core, respectively, or both of the positive and negative tabs of the adjacent positive and negative electrode plates in adjacent layers are located at the upper end or the lower end of the electric core. The separator may comprise a polyethylene micro-porous membrane or a laminated polypropylene and polyethylene micro-porous membrane.

The positive electrode active substance of the positive electrode plate may comprise a lithium-transition metal composite oxide, which is an active substance with a specific structure and can react reversibly with the lithium ions. The active material may be at least one selected from $Li_xNi_{1-y}CoO_2$ ($0.95 \leq x \leq 1.1$, $0 \leq y \leq 1.0$), and $Li_xMn_{2-y}B_yO_2$ (B may be a transition metal, $0.95 \leq x 1.1$, $0 \leq y \leq 1.0$). Besides, the positive electrode plate may also comprise the positive current collecting substrate (generally made of a metal such as aluminum foil), a carbon system conductive agent as the additive, and the adhesive for binding the positive electrode material onto the current collecting substrate. The carbon system conductive agent may be at least one selected from carbon black, carbon fiber and graphite. The adhesive may be at least one selected from fluorine-containing resins and polyolefin compounds such as PVDF, polytetrafluoroethylene (PTFE), vinylidene fluoride-hexafluoropropylene-tetrafluoroethylene (VDF-HFP-TFE) copolymer, and styrene butadiene rubber (SBR).

The negative electrode active substance may comprise a carbon system material that may realize repeated lithium ion intercalation and de-intercalation. According to some embodiments of the present disclosure, the negative electrode active material may be at least one selected from graphite, petroleum coke, organic cracked carbon, mesocarbon microbeads (MCMB), and mesocarbon fibers (MCF). Besides, the negative electrode may also comprise the negative current collecting substrate (generally made of a metal such as copper foil) and the adhesive for binding the negative electrode active material onto the negative current collecting substrate. According to some embodiments of the present disclosure, the adhesive may comprise at least one selected from fluorine-containing resins and polyolefin compounds such as PVDF, PTFE, VDF-HFP-TFE copolymer and SBR.

The positive and negative slurries may be prepared by dissolving the adhesive into the solvent to obtain a solution, and then adding and adequately dispersing the active substance and a conductive agent as the additive into the solution. According to some embodiments of the present disclosure, the solvent may comprises at least one selected from NMP, DMF, diethyl formamide (DEF), dimethyl sulphoxide (DMSO), tetrahydrofuran (THF), water and alcohol.

The electrolyte may comprise a mixed solution of the electrolyte salt and the solvent. According to some embodiments of the present disclosure, the electrolyte salt may comprise a lithium salt comprising at least one selected from $LiClO_4$, $LiPF_6$, $LiBF_4$, $LiAsF_6$, lithium halide, lithium aluminum tetrachloride, and lithium fluoro-alkyl sulfonate. The solvent may comprise a mixture of chain-like acid esters and cyclic acid esters. The chain-like acid esters may comprise at least one selected from DMC, DEC, EMC, MPC, DPC, MA, EA, PA, dimethoxyethane and other fluorine-containing, sulfur-containing or unsaturated bond-containing chain-like organic esters. The cyclic acid esters may comprise at least one selected from ethylene carbonate (EC), propylene carbonate (PC), vinylene carbonate (VC), γ-butyrolactone (γ-BL), sultone and other fluorine-containing, sulfur-containing or unsaturated bond-containing cyclic organic esters.

According to some embodiments of the present disclosure, for preparing the positive electrode plate, a certain amount of the positive electrode active substance, the conductive agent, the adhesive and the solvent are mixed according to a certain ratio to form a uniform positive slurry, and the positive slurry is coated onto the positive current collecting substrate uniformly, dried and rolled to obtain the positive electrode plate. Then a certain width of the coating on an edge of the positive electrode plate is removed to form the positive tab. Finally, the positive electrode plate thus formed is sandwiched between polypropylene micro-porous separators or laminated polyethylene and polypropylene micro-porous separators, and then the separators are sealed to form a positive electrode plate bag.

According to some embodiments of the present disclosure, for preparing the negative electrode plate, a certain amount of the negative electrode active substance, the adhesive and the solvent are mixed according to a certain ratio to form a uniform negative slurry, and the negative slurry is coated onto the negative current collecting substrate uniformly, dried and rolled to obtain the negative electrode plate. Then a certain width of the coating on an edge of the negative electrode plate is removed to form the negative tab. Finally, the negative electrode plate thus formed is sandwiched between polypropylene micro-porous separators or laminated polyethylene and polypropylene micro-porous separators, and then the separators are sealed to form a negative electrode plate bag.

The above sealed positive and negative plate bags are staggered and laminated to form the electric core of the lithium ion battery. The electric core may be clipped tightly by an upper clamping plate and a lower clamping plate. The tabs and the electrode poles are then connected by a flexible connector to form a current collecting structure. According to some embodiments, the connection between the flexible connector and the electrode plates may be riveting, while the connection between the flexible connector and the electrode poles may be bolting. The electric core may be placed into the battery shell, and then the electrolyte formed by dissolving $LiPF_6$ with a concentration of 1 mol/L in a mixed solvent of EC and DMC (in a ratio of 1:1 by volume) may be injected into the battery shell which may be then sealed to obtain the lithium ion battery.

In the lithium ion battery according to some embodiments of the present disclosure, the length, width and height of the shell may have a ratio of 50-800:30-500:5-500.

According to some embodiments of the present disclosure, the length, width and height of the electric core may have a ratio of 45-795:25-495:5-100.

Example 1

A lithium ion battery was prepared, in which a shell was made of aluminum and was substantially rectangular parallelepiped, with a length of 28 mm, a width of 100 mm, and a height of 356 mm.

(1) Preparation of a Positive Electrode Plate 100 parts by weight of $LiCoO_2$ as a positive electrode active material, 5 parts by weight of acetylene black as a conductive agent, and 5 parts by weight of PVDF as an adhesive were added into 50 parts by weight of NMP, and the mixture was mixed uniformly to form a positive slurry. The positive slurry was then uniformly coated onto an aluminum foil having a thickness of about 0.016 mm as a positive current collecting substrate. A positive tab was formed by removing the coating from a portion of the aluminum foil, and the positive current collecting substrate was then placed in a vacuum oven for drying at about 120° C. The dried current collecting substrate was cut into a positive electrode plate size of about 2010×296×0.138 mm. The weight of the coating on the positive electrode plate was about 149.62 g.

(2) Preparation of a Negative Electrode Plate 100 parts by weight of artificial graphite as a negative electrode active substance and 9 parts by weight of PVDF as an adhesive were added into 50 parts by weight of NMP, and the mixture was mixed uniformly to form a negative slurry. The negative slurry was then uniformly coated onto a copper foil with a thickness of 0.012 mm as a negative current collecting substrate. The negative tab was formed by removing the coating form a portion of the copper foil, and the negative current collecting substrate was further placed in a vacuum oven for drying at about 120° C. The dried current collecting substrate was cut into a negative electrode plate with a size of about 2290×305×0.121 mm. The weight of the coating on the negative electrode plate was about 85.44 g.

(3) Preparation of a Flat Type Electric Core

The positive electrode plate, the negative electrode plate prepared above and a separator were wound into a flat type electric core having a size of 300×300×50 mm.

(4) Assembly of a Battery $LiPF_6$ was dissolved in a mixed solvent of EC and DMC (in a ratio of about 1:1 by volume) to form a non-aqueous electrolyte solution in which the concentration of $LiPF_6$ was about μmol/L. About 360 g of the non-aqueous electrolyte solution was used for each electric core. The flat type electric core obtained in step (3) was accommodated in the battery shell having a size of 28×100×356 mm, and a filler comprising 40 g of PPS particles and polyphenylene oxide particles in total with an average diameter of about 2 mm was filled in a space between the battery shell and the electric core. The non-aqueous electrolyte prepared above was injected into the battery, and the battery was then sealed by a cover board to form a lithium ion battery C1. 2000 batteries C1 were prepared accordingly.

Comparative Example 1

The preparation method in Comparative Example 1 was substantially the same as that in Example 1, except that no filler was filled into the space between the shell and the electric core. A comparative lithium ion battery TC1 was thus obtained. 2000 batteries TC1 were prepared accordingly.

Example 2

The preparation method in Example 2 was substantially the same as that in Example 1, except that a filler was used comprising about 30 g of hollow spherical polytetrafluoroethylene particles having an outer diameter of about 2 mm and an inner diameter of about 1 mm. The obtained lithium ion battery was designated as C2, and 2000 batteries C2 were prepared accordingly.

Example 3

The preparation method in Example 3 was substantially the same as that in Example 1, except that a filler was used comprising about 30 g of hollow spherical High Density Polyethylene (HDPE) particles having an outer diameter of about 12 mm and an inner diameter of about 1 mm. The obtained lithium ion battery was designated as C3, and 2000 batteries C3 were prepared accordingly.

Example 4

The preparation method in Example 4 was substantially the same as that in Example 1, except that a filler was used comprising 30 g of hollow spherical HDPE particles having an outer diameter of about 8 mm and an inner diameter of about 5 mm. The obtained lithium ion battery was designated as C4, and 2000 batteries C4 were prepared accordingly.

Tests

The cycle performance, capacity, and inner resistance of the battery samples TC1, C1, C2, C3 and C4 were tested below.

Cycle Performance Test

The cycle performance test was performed by using the equipment BK-7024L/60 (Guangdong Lanqi Electronic Experiment Co. Ltd). The operation conditions were as follows:

constant current: about 0-60 A; current resolution: about 10 mA; current set accuracy: about ±(0.1% RD+0.1% FS); test accuracy: about ±(0.1% RD+0.1% FS); voltage test range: about 0-5 V; voltage resolution: about 1 my; voltage to be tested range: about 2.5~4.5 V; constant voltage set range: about DC 2.5~4.5 V; constant voltage set accuracy: about ±(0.1% RD+0.1% FS); voltage test accuracy: about ±(0.1% RD+0.1% FS); time range: about 0-30000 min/work step; and precision: about ±0.1%. The test results are shown in Table 2.

Inner Resistance Test

HK3560 (Taiwan Hepu) Inner Resistance Test Equipment was used and the test results are shown in Table 1.

Battery Capacity Test

A BCT-0105 battery capacity tester (Shenzhen Chaosisi Electronic Co. Ltd) was used. The test results are shown in Table 1.

TABLE 1

| Serial Number | Electrolyte Amount (ml) | Inner Resistance mΩ | Battery Capacity (mAh) |
|---|---|---|---|
| C1 | 360 | 1.0 | 57000 |
| C2 | 360 | 0.9 | 57500 |
| C3 | 360 | 0.9 | 57500 |
| C4 | 360 | 0.9 | 57500 |
| TC1 | 360 | 1.3 | 55000 |

TABLE 2

| Serial Number | Remaining Capacity After 500 Cycles at Normal Temperature | Remaining Capacity After 200 Cycles at 60° C. |
|---|---|---|
| C1 | 99.6% | 99.3% |
| C2 | 99.7% | 99.6% |
| C3 | 99.7% | 99.5% |
| C4 | 99.6% | 99.2% |
| TC1 | 96.7% | 95.4% |

It can be seen from Table 1 that the samples prepared according to the embodiments of the present disclosure may have an inner resistance up to about 1.0 mΩ which is lower than 1.3 mΩ in the Comparative Example 1. The lower the inner resistance, the higher the safety performance. The battery capacity of the samples prepared according to the embodiments of the present disclosure was up to 57500 mAh which is higher than 55000 mAh in the Comparative Example 1. It can be seen from Table 2 that after 500 cycles at normal temperature, the sample in Comparative Example 1 has a much lower remaining capacity of 96.7% than those prepared according to the present disclosure. After 200 cycles at 60° C., the sample in Comparative Example 1 has a much lower remaining capacity of 95.4% than those prepared according to the present disclosure.

Although explanatory embodiments have been shown and described, it would be appreciated by those skilled in the art that changes, alternatives, and modifications all falling into the scope of the claims and their equivalents can be made in the embodiments without departing from spirit and principles of the invention.

What is claimed is:

1. A lithium ion battery, comprising:
   a shell,
   an electric core disposed in the shell with a space formed therebetween, and
   a non-aqueous electrolyte housed in the shell,
   wherein the space is filled with a non-aqueous electrolyte resistant filler.

2. The lithium ion battery according to claim 1, wherein the particulate material comprises hollow spherical particles having an average inner diameter ranging from about 1 mm to about 10 mm and an average outer diameter ranging from about 2 mm to about 15 mm.

3. The lithium ion battery according to claim 2, wherein the particulate material comprises hollow spherical particles having an inner diameter of 1 mm and an outer diameter of 2 mm.

4. The lithium ion battery according to claim 2, wherein the particulate material comprises hollow spherical particles having an inner diameter of 1 mm and an outer diameter of 12 mm.

5. The lithium ion battery according to claim 2, wherein the particulate material comprises hollow spherical particles having an inner diameter of 5 mm and an outer diameter of 8 mm.

6. The lithium ion battery according to claim 1, wherein the particulate material comprises spherical particles having a diameter of 2 mm.

7. The lithium ion battery according to claim 1, wherein the filler comprises at least one selected from polyphenylene sulfide, polyphenylether, polyethylene, polypropylene, polytetrafluoroethylene, polyperchlorethylene, high density polyethylene, and polyvinylidene chloride.

8. The lithium ion battery according to claim 1, wherein the electric core is formed by superposing or winding a positive electrode plate, a negative electrode plate, and a separator between the positive electrode plate and the negative electrode plate.

9. The lithium ion battery according to claim 1, wherein the shell has a ratio of length:width:height of about 50-800:30-500:5-500.

10. The lithium ion battery according to claim 1, wherein the electric core has a ratio of length:width:height of about 45-795:25-495:5-100.

* * * * *